(12) United States Patent
Dame et al.

(10) Patent No.: US 9,387,890 B2
(45) Date of Patent: Jul. 12, 2016

(54) WALL PANEL FOR RECREATIONAL VEHICLE

(71) Applicant: Composite Solutions, Inc., Junction City, OR (US)

(72) Inventors: Dennis Dame, Harrisburg, OR (US); Jeffrey Chase, Junction City, OR (US)

(73) Assignee: Composite Solutions, Inc., Junction City, OR (US)

( * ) Notice: Subject to any disclaimer, the term of this patent is extended or adjusted under 35 U.S.C. 154(b) by 0 days.

(21) Appl. No.: 14/318,296

(22) Filed: Jun. 27, 2014

(65) Prior Publication Data

US 2015/0001883 A1 Jan. 1, 2015

Related U.S. Application Data

(60) Provisional application No. 61/841,792, filed on Jul. 1, 2013.

(51) Int. Cl.
*B62D 25/02* (2006.01)
*B62D 31/00* (2006.01)
*B62D 25/00* (2006.01)
*B60P 3/34* (2006.01)

(52) U.S. Cl.
CPC .............. *B62D 31/00* (2013.01); *B62D 25/025* (2013.01); *B60P 3/34* (2013.01); *B62D 25/00* (2013.01)

(58) Field of Classification Search
CPC ...... B62D 25/025; B62D 31/00; B62D 25/00; B60P 3/34
USPC ................................................ 296/191, 26.12
See application file for complete search history.

(56) References Cited

U.S. PATENT DOCUMENTS

| | | | |
|---|---|---|---|
| 4,725,091 A * | 2/1988 | Fujii | B60J 1/10 105/401 |
| 5,344,700 A | 9/1994 | McGath et al. | |
| 5,454,198 A | 10/1995 | Aulson | |
| 8,124,908 B2 * | 2/2012 | Komaki et al. | 219/121.6 |
| 8,454,072 B2 | 6/2013 | Chase et al. | |
| 8,656,841 B2 * | 2/2014 | Taguchi et al. | 105/396 |
| 2008/0202035 A1 | 8/2008 | Gepfrey et al. | |

* cited by examiner

*Primary Examiner* — Glenn Dayoan
*Assistant Examiner* — Melissa A Black
(74) *Attorney, Agent, or Firm* — Klarquist Sparkman, LLP

(57) ABSTRACT

The present application relates to a wall panel for recreational vehicles. In one representative embodiment, a wall panel for a recreational vehicle comprises a main body defining at least one pre-formed panel opening, and an inwardly extending peripheral flange located along a perimeter of the at least one pre-formed panel opening. The wall panel is configured to be mounted onto a structural wall of the recreational vehicle such that the peripheral flange covers an inner surface of a corresponding opening defined in the structural wall.

17 Claims, 8 Drawing Sheets

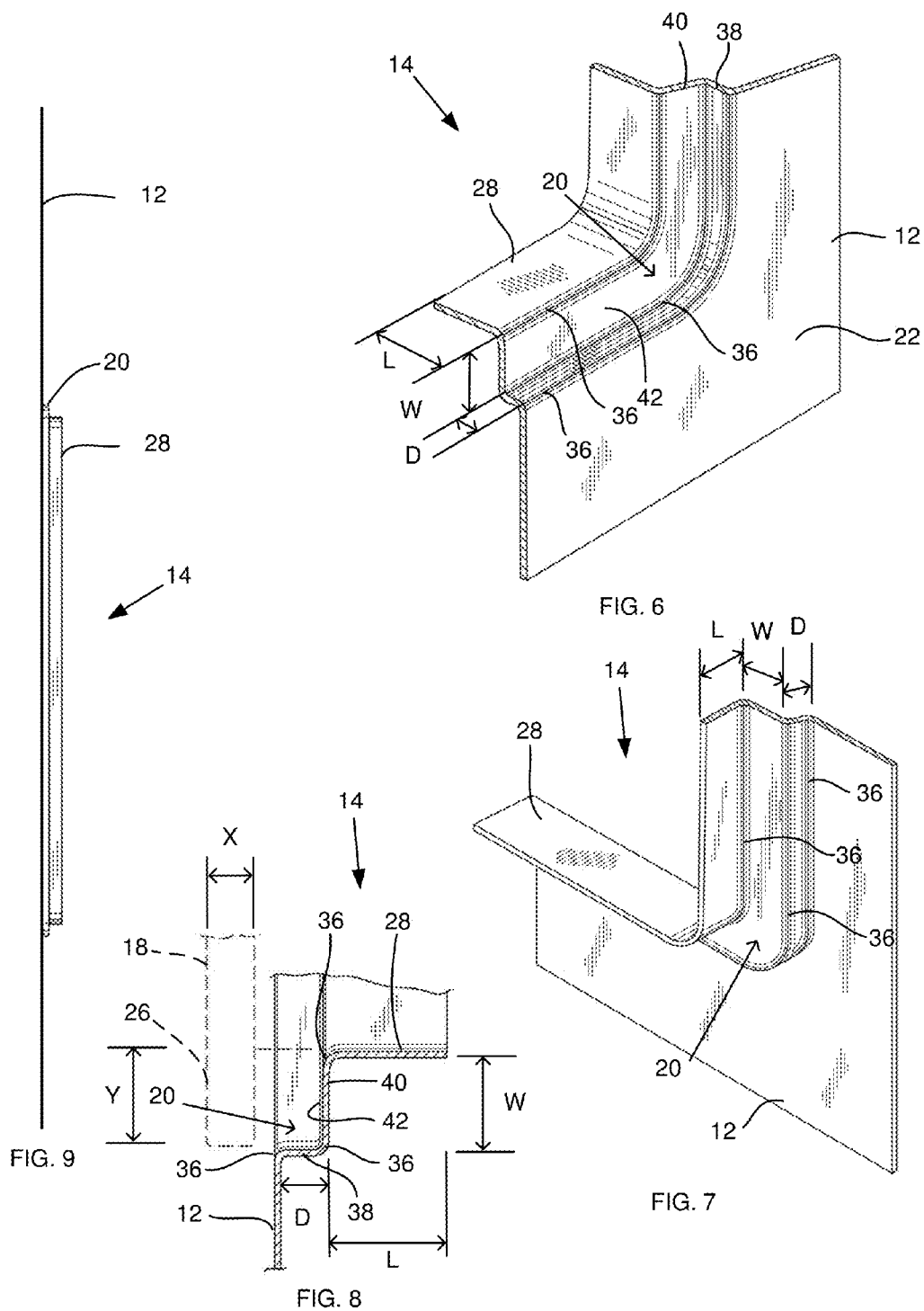

WALL PANEL FOR RECREATIONAL VEHICLE

CROSS REFERENCE TO RELATED APPLICATION

The present application claims the benefit of U.S. Provisional Application No. 61/841,792, filed Jul. 1, 2013, which is incorporated herein by reference in its entirety.

FIELD

The present application relates to a wall panel for recreational vehicles.

BACKGROUND

Many recreational vehicles (RV) have walls that include various features or structures such as windows, doors, slide-rooms, vents, televisions, etc. In a conventional RV wall construction, a wall blank is first produced by constructing a frame from materials such as aluminum, wood, steel, etc., and filling the frame with insulation (e.g., foam, fiberglass batting, etc.) to form a structural wall. An interior laminate (e.g., wood paneling, fiberglass, etc.) is affixed to one side of the structural wall to form the interior side of the wall blank, and an exterior laminate (e.g., fiberglass, aluminum, steel, etc.) is affixed to the other side of the structural wall to form the exterior side of the wall blank. Often, additional materials such as wood paneling, Coremat®, or fiberglass will be included to stiffen the laminates, add thickness, and/or prevent the frame of the structural wall from "printing through" onto the laminate surface. The areas that are to receive features are then cut out of the wall blank, and the cut pieces of the wall blank are either incorporated into other portions of the RV or discarded.

The rough-cut openings in the wall blank must then be finished with an additional molding or covering before the respective features can be installed. Typically, this molding is specially-made from materials such as aluminum, plastic, and/or composite materials. This process results in increased material and labor costs, and waste of expensive materials. Accordingly, improvements to the fabrication of RV walls are desirable.

SUMMARY

Several embodiments of a wall panel for a recreational vehicle are shown and described herein. In one representative embodiment, a wall panel for a recreational vehicle comprises a main body defining at least one pre-formed panel opening, and an inwardly extending peripheral flange located along a perimeter of the at least one pre-formed panel opening. The wall panel is configured to be mounted onto a structural wall of the recreational vehicle such that the peripheral flange covers an inner surface of a corresponding opening defined in the structural wall.

In another representative embodiment, a method of installing a wall panel on a recreational vehicle comprises providing a wall panel having at least one pre-formed panel opening and an inwardly extending peripheral flange located along a perimeter of the at least one pre-formed panel opening. The method further comprises mounting the wall panel on a structural wall of the recreational vehicle. The structural wall can define at least one corresponding structural wall opening such that the peripheral flange covers an inner surface of the at least one structural wall opening.

The foregoing and other features and advantages of the disclosure will become more apparent from the following detailed description, which proceeds with reference to the accompanying figures.

BRIEF DESCRIPTION OF THE DRAWINGS

FIG. 6 is a partial perspective view of the front of the wall panel of FIG. 1.

FIG. 7 is a partial perspective view of the rear of the wall panel of FIG. 1.

FIG. 8 is a partial cross-sectional view of the wall panel of FIG. 1 illustrating receipt of a wall flange of a slide-room by a recessed portion of the wall panel.

FIG. 9 is a side elevation view of the wall panel of FIG. 1.

DETAILED DESCRIPTION

The present disclosure concerns embodiments of a wall panel for a vehicle. A vehicle can have one or more wall panels of the same size and shape or differing sizes and/or shapes. As used herein, the term "vehicle" refers generally to any vehicle that has a power source (e.g., motor or engine) or a towable vehicle that is coupled to a driven vehicle for travelling from place to place. A vehicle can include, without limitation, a tractor-trailer, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of wall panels disclosed herein can also be installed in less mobile structures, such as mobile homes, house boats, mobile offices or command centers. If desired, the wall panels can also be installed in permanent structures, such as houses, stores, etc.

Figure 1:
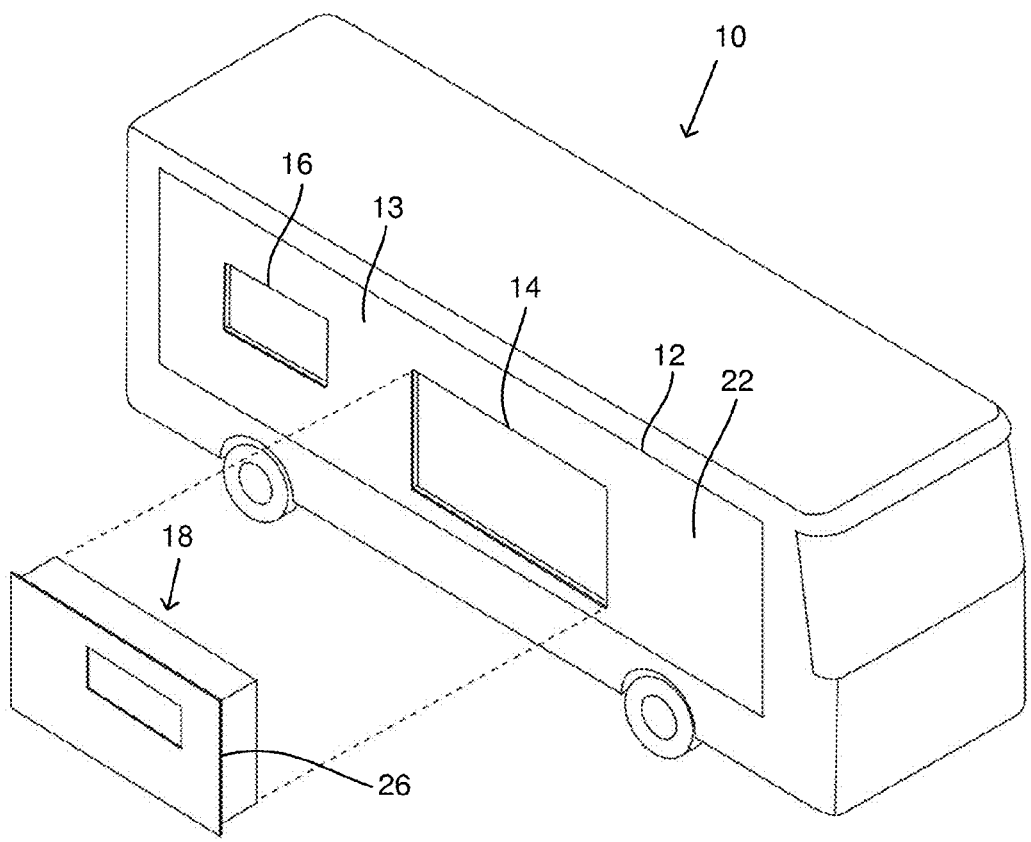
FIG. 1 is a perspective view of a recreational vehicle having a wall panel according to one embodiment.

FIG. 1 illustrates a vehicle 10 in the form of a recreational vehicle (RV) having a wall panel 12 configured as the exterior surface of the RV wall. In the illustrated embodiment, the wall panel 12 includes a main body 13 and first and second pre-formed panel openings 14 and 16. As used herein, the term "pre-formed" means that an opening or other component of a wall panel is formed in the wall panel when it is molded or otherwise made. The first panel opening 14 is configured to receive a slide-room 18, which includes a peripheral wall flange 26 and is movable through the first panel opening 14 between a retracted position and an extended position. The second panel opening 16 can be configured to receive, for example, a window. In alternative embodiments, the wall panel 12 can have a single pre-formed panel opening, or more than two pre-formed panel openings (see, e.g., FIG. 15), as desired. In some embodiments, the wall panel 12 can extend along substantially the entire length of one side of the RV 10. The pre-formed panel opening(s) can also be any of various shapes and sizes, depending upon the particular structural feature to be installed in the wall of the vehicle.

Figure 2:
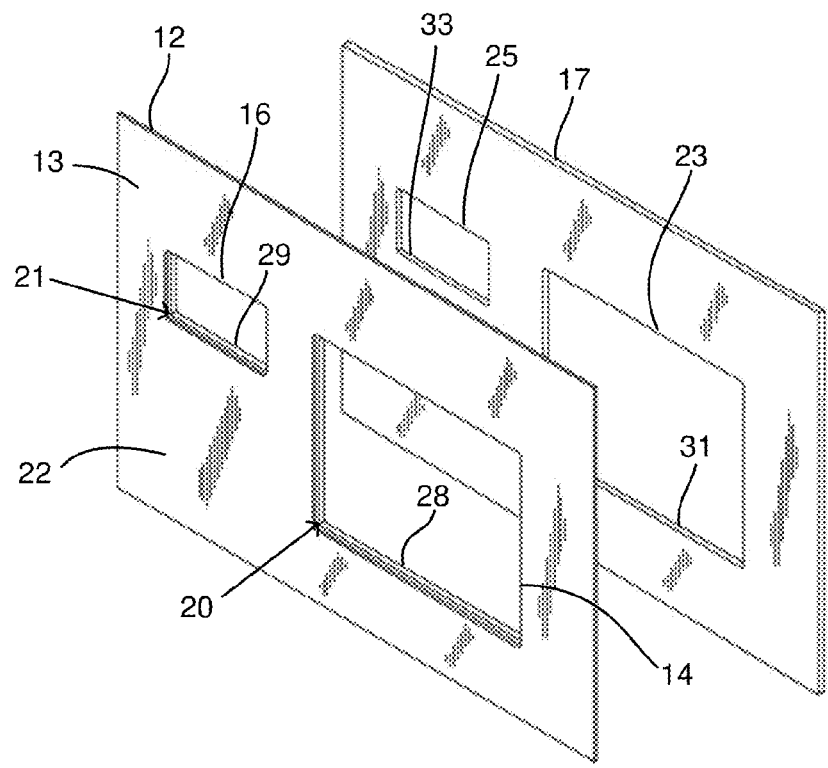
FIG. 2 is an exploded perspective view of the front of the wall panel of FIG. 1 and structural wall of the vehicle.
Figure 3:
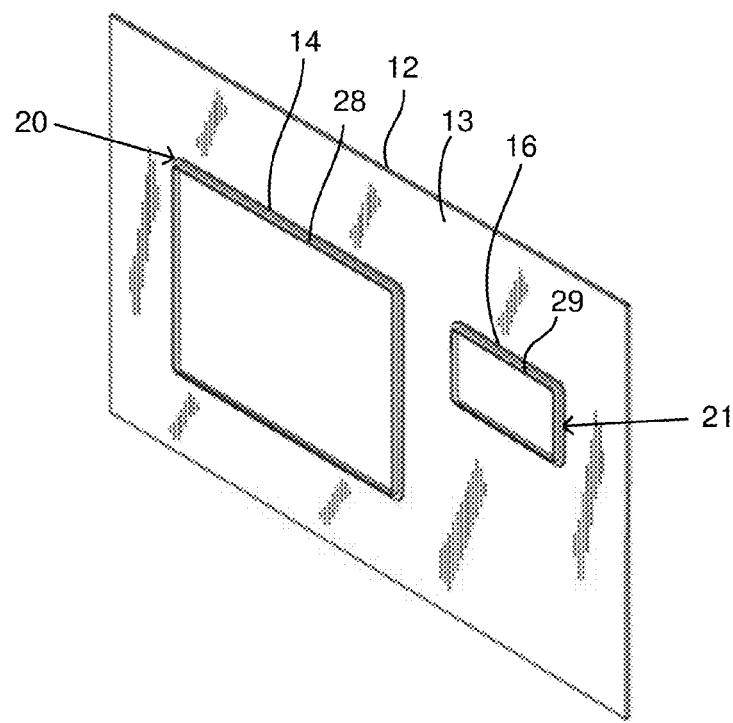
FIG. 3 is a perspective view of the rear of the wall panel of FIG. 1.
Figure 4:
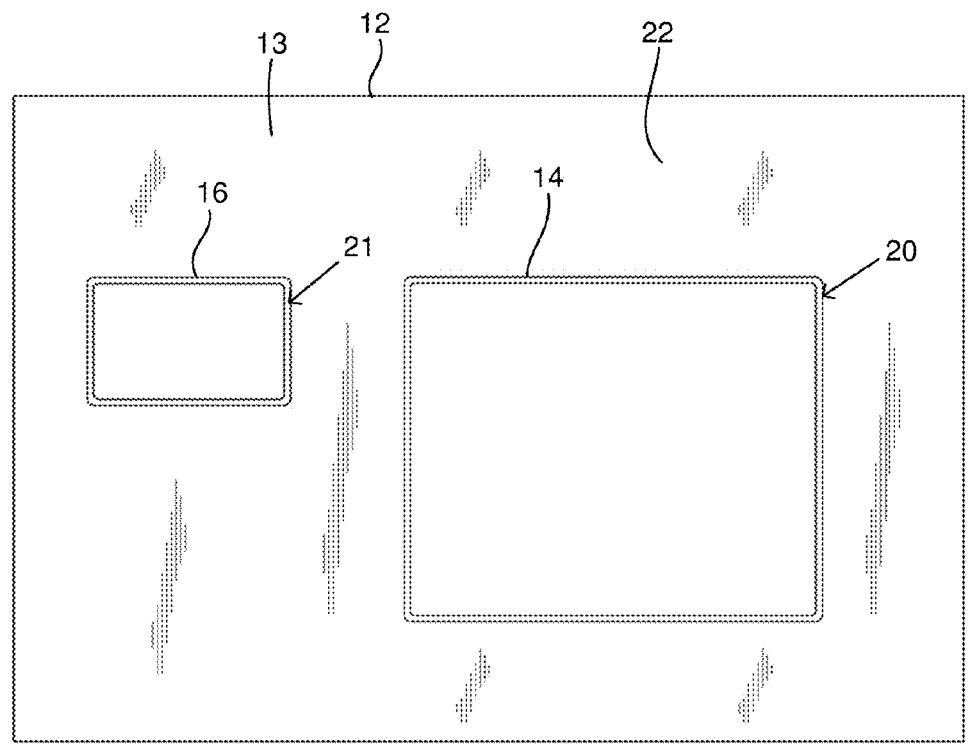
FIG. 4 is a front elevational view of the wall panel of FIG. 1.
Figure 5:
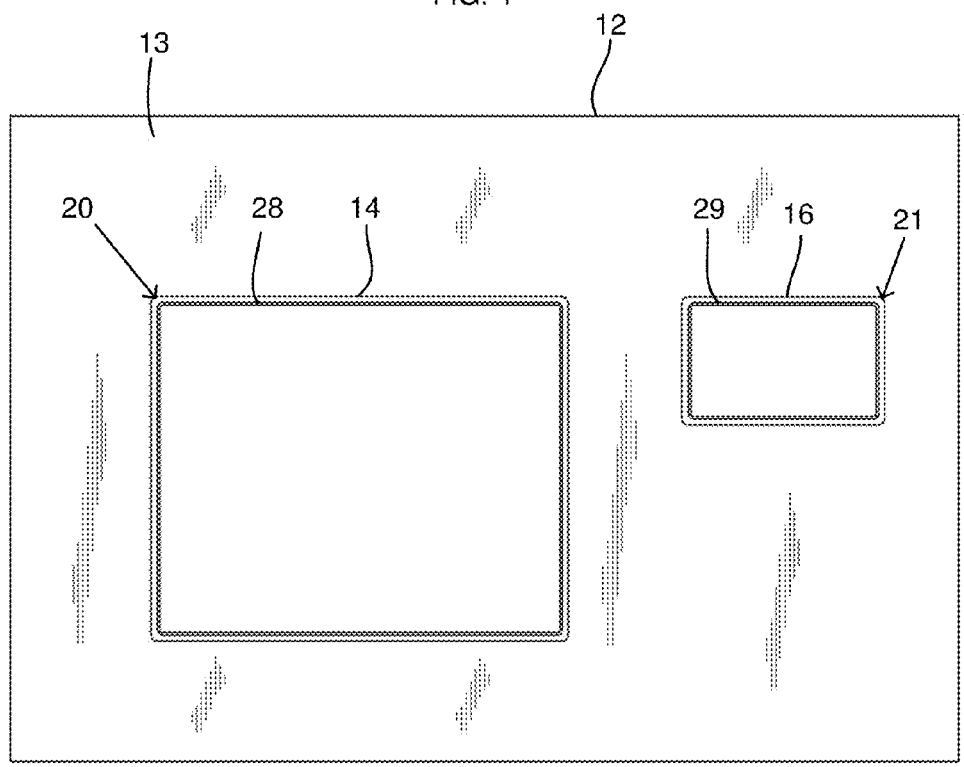
FIG. 5 is a rear elevational view of the wall panel FIG. 1.

The wall panel 12 can be a one-piece unitary construction, and can be mounted to the exterior of a prefabricated structural wall or frame 17 (see FIGS. 2 and 10-12) of the RV 10 by, for example, adhesives or fasteners (e.g., screws, rivets, etc.). As used herein, the terms "unitary construction" and "integrally formed" refer to a construction that does not include any welds, fasteners, or other means for securing separately formed pieces of material to each other. As shown in FIG. 2, the structural wall 17 can have rough-cut wall openings 23 and 25 corresponding to the first and second panel openings 14 and 16, respectively, of the wall panel 12. In this manner, when the wall panel 12 is mounted to the structural wall 17, the wall openings 23, 25 in the structural wall 17 are aligned with the first and second panel openings 14, 16 of the wall panel 12. In alternative embodiments, the wall panel 12 can include any number of pre-formed panel openings configured to receive any combination of features or structures (e.g., windows, doors, slide-rooms, vents, televisions, etc.).

Referring to FIGS. 2-9, the wall panel 12 can include pre-formed peripheral recessed portions 20 and 21 extending along the perimeter of the respective panel openings 14 and 16 on the exterior surface 22 of the wall panel 12. For ease of illustration, portions of the following description proceed with respect to the recessed portion 20 of the panel opening 14. However, it should be understood that the following description is applicable to the recessed portion 21 of the wall opening 16 and/or any other recessed portion of any other panel opening disclosed herein. The recessed portion 20 can be defined by one or more bends or radiused corners 36 in the material of the wall panel 12 surrounding the panel opening 14 so as to form a first portion 38 and a second portion 40, as shown in FIGS. 6, 7, and 8. The first portion 38 can extend inwardly (i.e., rearwardly) from the wall panel 12, and the second portion 40 can extend orthogonally with respect to the first portion 38 (i.e., parallel to the exterior surface 22), as shown in FIGS. 6 and 8.

The second portion 40 defines a secondary surface 42 that can be inwardly offset from the exterior surface 22 of the wall panel 12 by a depth D. The recessed portion 20 can also have a width dimension W, as shown in FIGS. 6, 7 and 8. Depending upon the structure or feature to be accommodated (e.g., slide-room 18), the width W and the depth D of the recessed portion 20 can be configured such that when installed, the exterior surface of the feature is substantially flush with the exterior surface 22 of the wall panel 12. For example, as shown in FIG. 8, the depth D of the recessed portion 20 can be substantially equal to a thickness X of the wall flange 26 of the slide-room 18 (shown in phantom). Similarly, the width W of the recessed portion 20 can be substantially equal to a length dimension Y of the wall flange 26. In this manner, the interior surface of the wall flange 26 of the slide-room 18 contacts the secondary surface 42 of the recessed portion 20 when the slide-room 18 is in the retracted position, and the exterior surface of the wall flange 26 is substantially flush with the exterior surface 22 of the wall panel 12 (for purposes of illustration, the slide-room 18 is shown in a partially extended position in FIG. 8). This concept is applicable to other structures such as window frames, door jambs, etc., in which the width W and the depth D of the recessed portion 20 can be configured such that the exterior surfaces of the respective structures are substantially flush with the exterior surface 22 of the wall panel 12 when installed.

In the embodiment shown, the radiused corners 36 in the material of the wall panel 12 that define the recessed portion 20 can be configured such that an angle between the peripheral flange 28 and the secondary surface 42 is substantially 90 degrees, and the secondary surface 42 is substantially parallel to the exterior surface 22 of the wall panel 12. However, the radiused corners 36 can be configured such that the secondary surface 42 has any suitable planar orientation or taper with respect to the exterior surface 22 depending upon the shape of the particular feature to be accommodated. In alternative embodiments, the recessed portions 20 and 21 can have any suitable number of radiused corners, planes or secondary surfaces. In this manner, the recessed portions 20 and 21 can allow the wall panel 12 to accommodate various structures while presenting an aesthetically pleasing exterior profile. Additionally, in the illustrated embodiment, the recessed portions 20 and 21 are substantially the same shape as the respective panel openings 14 and 16 that they surround. However, the shape of the recessed portions 20 and 21 can be varied as necessary to match the shape of the particular feature to be accommodated.

Figure 10:
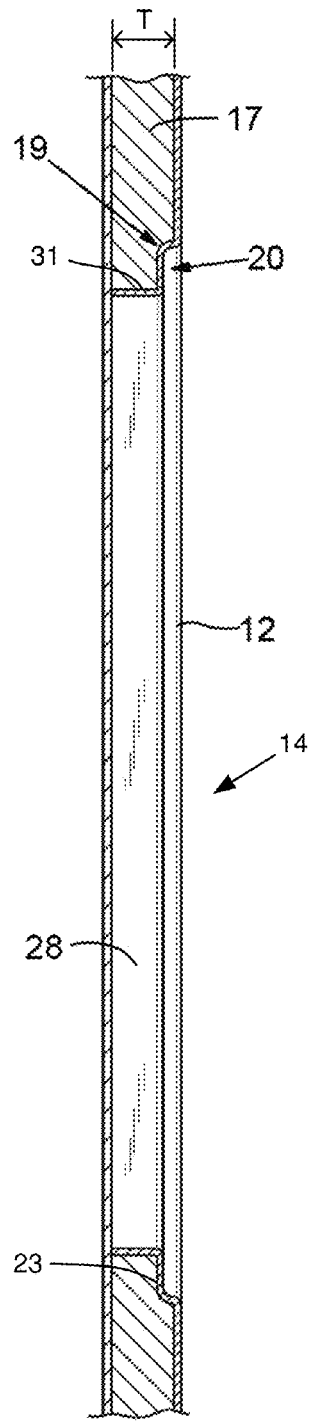
FIG. 10 is a partial side view of the wall panel of FIG. 1 mounted to a structural wall.
Figure 11:
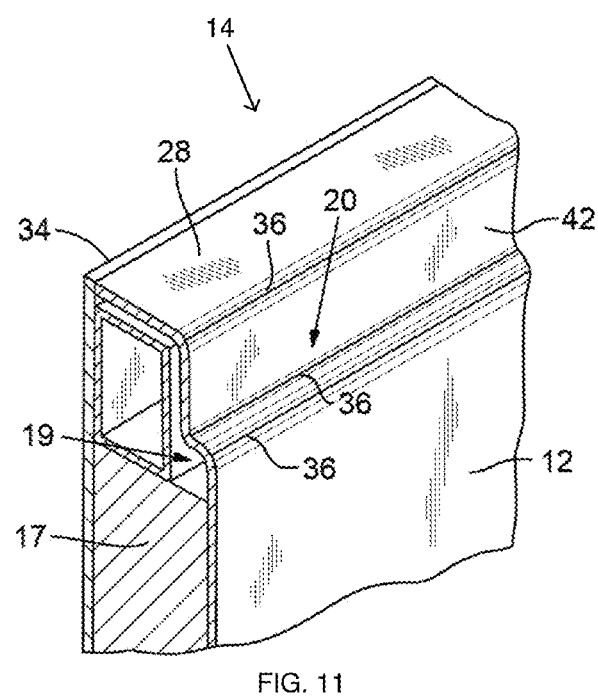
FIG. 11 is a partial perspective view of the wall panel of FIG. 1 mounted to another embodiment of a structural wall.

FIG. 10 illustrates the wall panel 12 mounted to the structural wall 17. The structural wall 17 can include a notch 19 surrounding the rough wall opening 23 with width and depth dimensions corresponding substantially to the width W and depth D of the recessed portion 20. In this manner, the structural wall 17 can accommodate the pre-formed recessed portion 20 of the wall panel 12 when the wall panel 12 is mounted to the structural wall 17. The notch 19 can conform substantially to the contours and radiused corners of the recessed portion 20, as shown in FIG. 10. Alternatively, the notch 19 can be, for example, a rectangular cutout, as shown in FIG. 11. In alternative embodiments, the recessed portion 20 can also be configured to accommodate additional elements, such as seals or gaskets. For example, the recessed portion 20 can include secondary recesses or wells in which seals or gaskets can be received to provide sealing between the slide-room 18 and the wall panel 12. Alternatively, the recessed portion 20 can accommodate seals or gaskets without secondary recesses or other formations. In another alternative embodiment shown in FIG. 12, the pre-formed panel opening 14 need not include a recess, but can be defined by a 90° angle or bend.

Referring again to FIGS. 2-9, the pre-formed panel openings 14 and 16 can also include respective integrally-formed peripheral flanges 28 and 29 that extend rearwardly or inwardly from respective second portions of the recessed portions, such as the second portion 40 of recessed portion 20. The peripheral flanges 28 and 29 can be located along the perimeters of the respective panel openings 14, 16, and can extend inwardly from the panel openings 14, 16 so as to cover rough-cut inner surfaces 31, 33 of the corresponding wall openings 23, 25 in the structural wall 17, as shown in FIG. 2. In this manner, when the wall panel 12 is mounted onto the structural wall 17, the peripheral flanges 28 and 29 cover the inner surfaces 31 and 33 of the respective rough-cut wall openings 23 and 25 to give the wall a finished appearance without the need for installation of additional materials.

Figure 12:
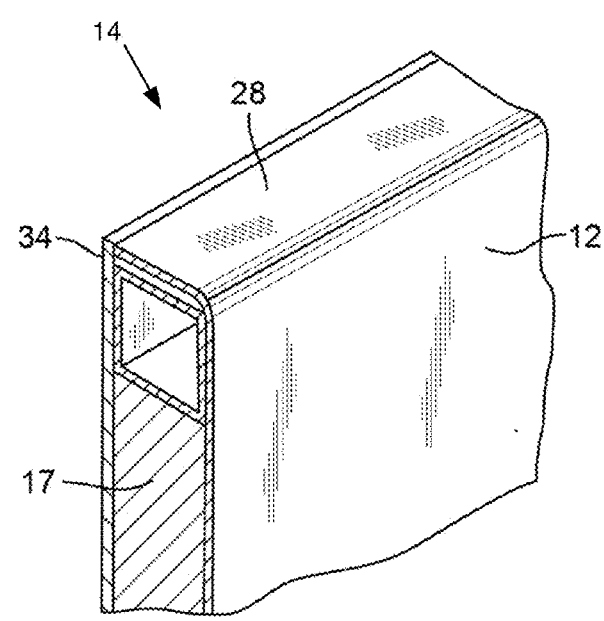
FIG. 12 is a partial view of an alternative embodiment of a wall panel mounted to a structural wall.

Referring again to panel opening 14 for ease of illustration, the peripheral flange 28 can have a length L, as shown in FIGS. 6, 7, and 8. In some embodiments, the length L of the peripheral flange 28, together with the depth D of the recessed portion 20, can substantially equal a thickness T of the structural wall 17 (see FIG. 10) such that the peripheral flange 28 covers and finishes the inner surface 31 of the wall opening 23. Alternatively, the length L of the peripheral flange 28 can also be configured to interface with or contact an interior laminate 34 applied to the interior-facing side of the structural wall 17, as shown in FIGS. 11 and 12. However, in further alternative embodiments, the length L of the peripheral flange 28 can be configured to extend over or cover the interior laminate 34. The peripheral flange 28 can also extend directly from the exterior surface 22 of the wall panel 12, as shown in FIG. 12.

The wall panel 12 can be fabricated from a variety of materials, including metal (e.g., aluminum, steel, etc.), or composite materials such as fiber-reinforced polymer (e.g., fiberglass, carbon fiber, etc.), and can be stamped, bent or molded as dictated by the particular material selected. In this manner, the wall panel 12 can be specially designed to include panel openings, recessed portions, and peripheral flanges of the appropriate sizes and shapes for any combination of features required by the RV design, and can be easily produced in the desired quantities. The wall panel 12 can then be mounted to the prefabricated structural wall 17 to create a finished RV wall that requires no additional moldings.

Figure 13:
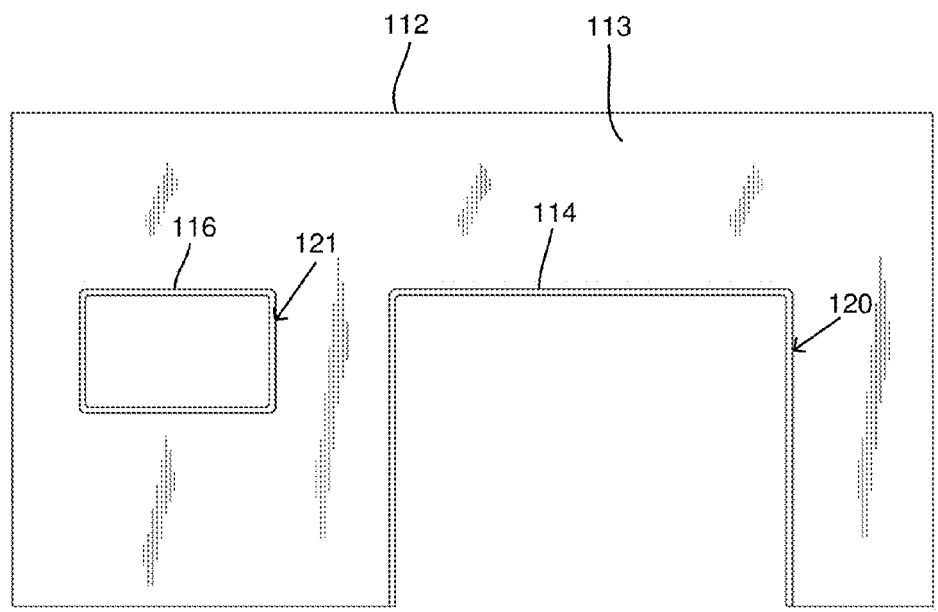
FIG. 13 is a front elevational view of another embodiment of a wall panel.
Figure 14:
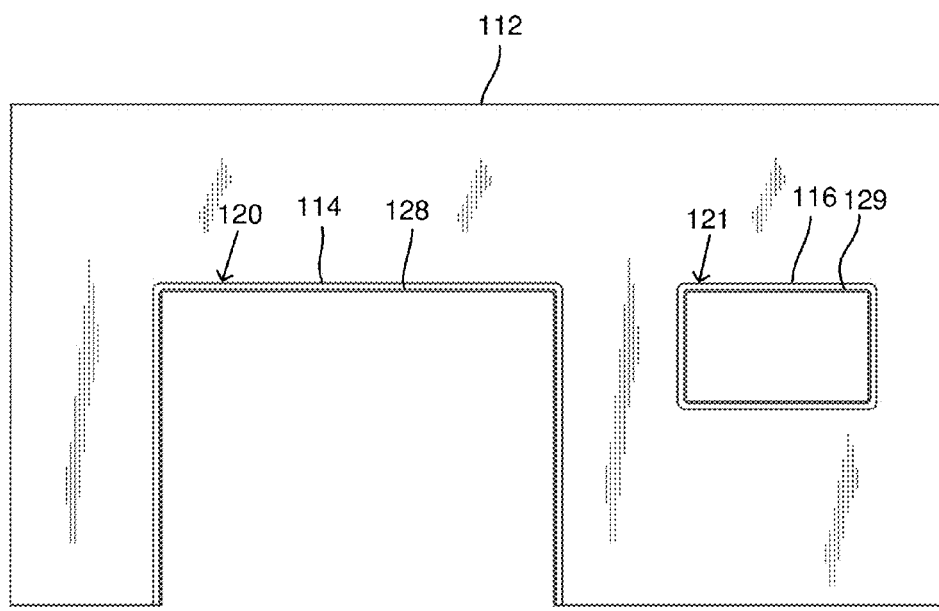
FIG. 14 is a rear elevational view of the wall panel of FIG. 13.

FIGS. 13-14 illustrate another embodiment of a wall panel 112. The wall panel 112 can have a one-piece unitary construction, and can have a main body 113 and first and second pre-formed panel openings 114, 116, with the first panel opening 114 extending to the lower edge of the wall panel 112. Each of the panel openings 114 and 116 can include respective pre-formed peripheral recessed portions 120 and 121, and integrally formed flanges 128 and 129 similar to the embodiment of FIG. 1, except that the recessed portion 120 and the flange 128 extend along only three sides of the first panel opening 114. The wall panel 112 can be configured to be mounted to a structural wall having wall openings corresponding to the panel openings 114, 116, similar to the embodiment of FIG. 1.

Figure 16:
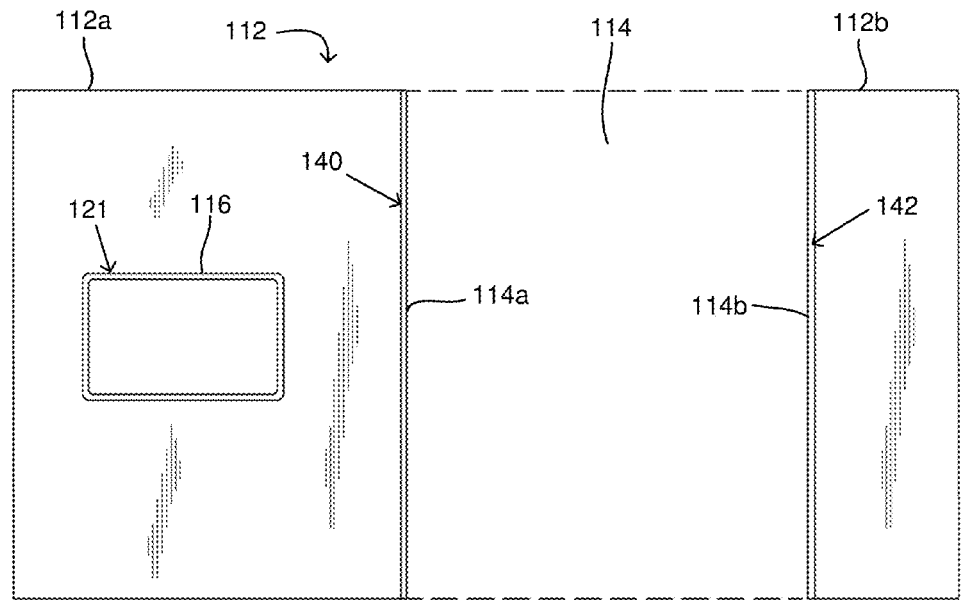
FIG. 16 is a front elevational view of an alternative embodiment of the wall panel of FIG. 13.
Figure 17:
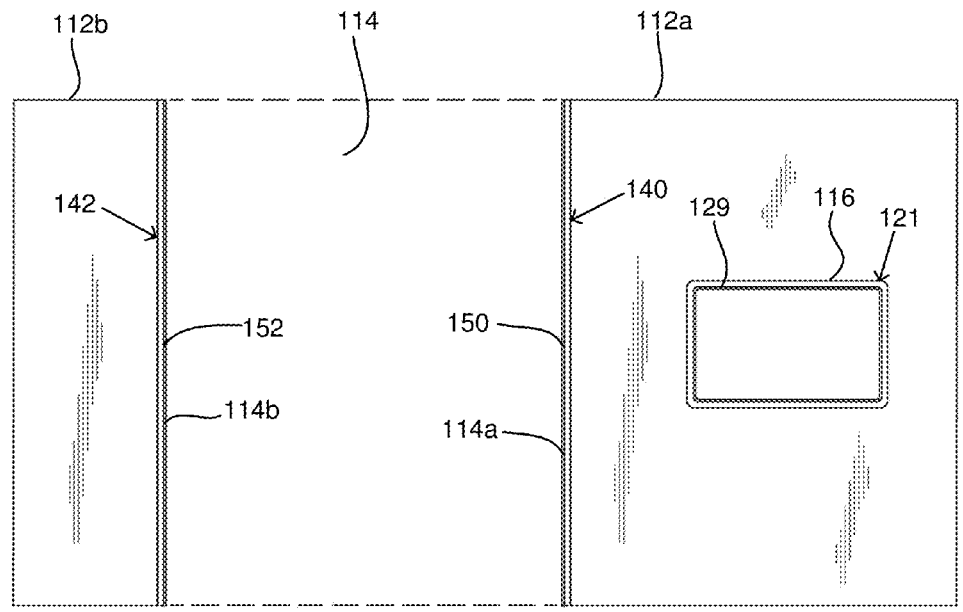
FIG. 17 is a rear elevational view of the wall panel of FIG. 16.

In an alternative embodiment of the wall panel 112 shown in FIGS. 16-17, the first pre-formed panel opening 114 can extend from the upper edge to the lower edge of the wall panel 112, dividing the wall panel 112 into first and second spaced-apart wall panel portions 112a, 112b, respectively. In the embodiment shown, the wall panel portions 112a and 112b can have respective spaced apart edge portions 114a, 114b, the distance between which can define the width of the first panel opening 114. The edge portions 114a, 114b of the wall panel portions 112a, 112b can include respective recessed portions 140 and 142, and flanges 150 and 152 similar to the embodiment of FIG. 1. In this manner, the first panel opening 114 can be configured to receive, for example, a slide-room that extends from the floor to the roof of an RV.

Figure 15:
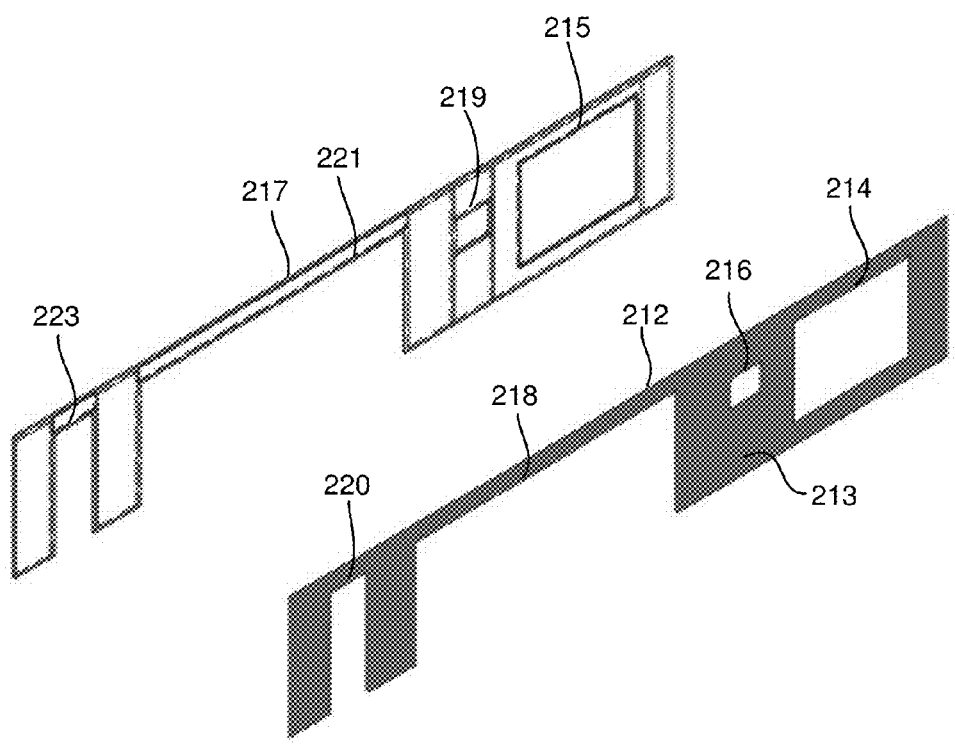
FIG. 15 is an exploded perspective view of another embodiment of a wall panel and a structural wall.

Referring now to FIG. 15, there is shown another embodiment of a wall panel 212 having a main body 213, a first pre-formed panel opening 214, a second pre-formed panel opening 216, a third pre-formed panel opening 218, and a fourth pre-formed panel opening 220. The first and second panel openings 214, 216 can be configured to receive, for example, a slide-room and a window, respectively, similar to the embodiment of FIG. 1. The third and fourth panel openings 218, 220 can be configured to receive, for example, a second slide-room and a door, respectively, or any other suitable feature. The wall panel 212 can have a one-piece unitary construction, and can include pre-formed peripheral recessed portions and integrally formed peripheral flanges similar to the recessed portions and flanges of the embodiment of FIG. 1. The wall panel 212 can also be mounted to a structural wall 217 having wall openings 215, 219, 221, and 223 corresponding to the pre-formed panel openings 214, 216, 218, 220, respectively, to form a finished RV wall that requires no additional moldings.

GENERAL CONSIDERATIONS

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In view of the many possible embodiments to which the principles of the disclosure may be applied, it should be recognized that the illustrated embodiments are only preferred examples should not be taken as limiting the scope of the disclosure. Rather, the scope of the disclosure is defined by the following claims. We therefore claim all that comes within the scope and spirit of these claims.

What is claimed is:

1. A wall panel for a recreational vehicle, comprising:
a main body defining at least one pre-formed panel opening;
a peripheral recessed portion located along a perimeter of the at least one pre-formed panel opening, the peripheral recessed portion including a first portion extending inwardly from an inner peripheral edge of an exterior surface of the main body, and a second portion extending toward a center of the opening from the first portion substantially parallel to the exterior surface of the main body such that a secondary surface of the second portion is offset toward the center of the opening with respect to the inner peripheral edge of the exterior surface of the main body; and a peripheral flange extending inwardly from the second portion and substantially perpendicular to the exterior surface of the main body;

wherein the wall panel is configured to be mounted onto a structural wall of the recreational vehicle such that the peripheral flange covers an inner surface of a corresponding opening defined in the structural wall.

2. The wall panel of claim 1, wherein a depth by which the secondary surface of the recessed portion is inwardly offset relative to the exterior surface of the wall panel, together with a length of the peripheral flange, is substantially equal to a thickness of the structural wall.

3. The wall panel of claim 1, wherein the peripheral recessed portion has a depth substantially equal to a thickness of a wall flange of a slide-room such that an outer surface of the flange of the slide-room is flush with an outer surface of the wall panel when the slide-room is in a retracted position.

4. The wall panel of claim 1, wherein the peripheral recessed portion is pre-formed.

5. The wall panel of claim 1, wherein the wall panel has a one-piece unitary construction.

6. The wall panel of claim 1, wherein a length of the peripheral flange is substantially equal to a thickness of the structural wall of the recreational vehicle.

7. The wall panel of claim 1, wherein the peripheral flange is integrally formed with the wall panel.

8. The wall panel of claim 1, wherein the at least one pre-formed panel opening is configured to receive a window, door, slide-room, vent, or television.

9. The wall panel of claim 1, comprising at least one of aluminum, steel, fiberglass, or carbon fiber.

10. A method of installing a wall panel on a recreational vehicle, comprising:

providing a wall panel having at least one pre-formed panel opening and a peripheral recessed portion located along the perimeter of the at least one pre-formed panel opening, the peripheral recessed portion including a first portion extending inwardly from an inner peripheral edge of an exterior surface of the wall panel and a second portion extending toward a center of the opening from the first portion substantially parallel to the exterior surface of the wall panel such that a secondary surface of the second portion is offset toward a center of the opening with respect to the inner peripheral edge of the exterior surface of the wall panel and substantially unobstructed by the exterior surface of the wall panel, the wall panel further including a peripheral flange extending inwardly from the second portion and substantially perpendicular to the exterior surface of the wall panel; and mounting the wall panel on an exterior surface of a structural wall of the recreational vehicle, the structural wall defining at least one corresponding structural wall opening such that the peripheral flange covers an inner surface of the at least one structural wall opening.

11. The method of claim 10, wherein mounting the wall panel comprises bonding the wall panel to the structural wall of the recreational vehicle with adhesive.

12. The method of claim 10, wherein mounting the wall panel comprises fastening the wall panel to the structural wall of the recreational vehicle with one or more fasteners.

13. The method of claim 10, wherein the wall panel has a one-piece unitary construction.

14. The method of claim 10, wherein the peripheral flange is integrally formed with the wall panel.

15. A method of installing a wall panel on a recreational vehicle, comprising:

providing a wall panel having at least one pre-formed panel opening and a peripheral recessed portion located along the perimeter of the at least one pre-formed panel opening, the peripheral recessed portion including a first portion extending inwardly from an exterior surface of the wall panel and a second portion extending from the first portion substantially parallel to the exterior surface of the wall panel, the wall panel further including a peripheral flange extending inwardly from the second portion and substantially perpendicular to the exterior surface of the wall panel; and mounting the wall panel on an exterior surface of a structural wall of the recreational vehicle, the structural wall defining at least one corresponding structural wall opening such that the peripheral flange covers an inner surface of the at least one structural wall opening;

wherein a slide-room is mounted within the structural wall opening and the peripheral recessed portion is sized and shaped such that when the slide-room is in a retracted position, a flange of the slide-room is received in the peripheral recessed portion.

16. The method of claim 15, wherein the peripheral recessed portion has a depth substantially equal to the thickness of the flange of the slide-room such that an outer surface of the flange of the slide-room is flush with an outer surface of the wall panel when the slide-room is in a retracted position.

17. The method of claim 16, wherein the second portion of the peripheral recessed portion further comprises a secondary surface inwardly offset from the exterior surface of the wall panel configured to receive the flange of the slide-room.

* * * * *